(12) United States Patent
Hamada et al.

(10) Patent No.: US 10,140,759 B2
(45) Date of Patent: Nov. 27, 2018

(54) THREE-DIMENSIONAL DISPLAY AND DATA GENERATION METHOD

(71) Applicant: TEAMLAB INC., Tokyo (JP)

(72) Inventors: Akinori Hamada, Tokyo (JP); Haozhe Li, Tokyo (JP); Toshiyuki Inoko, Tokyo (JP)

(73) Assignee: TEAMLAB INC., Tokyo (JP)

( * ) Notice: Subject to any disclaimer, the term of this patent is extended or adjusted under 35 U.S.C. 154(b) by 0 days.

(21) Appl. No.: 15/311,189

(22) PCT Filed: May 11, 2015

(86) PCT No.: PCT/JP2015/063512
§ 371 (c)(1),
(2) Date: Nov. 14, 2016

(87) PCT Pub. No.: WO2015/174378
PCT Pub. Date: Nov. 19, 2015

(65) Prior Publication Data
US 2017/0084079 A1    Mar. 23, 2017

(30) Foreign Application Priority Data
May 15, 2014  (JP) .................................. 2014-101339

(51) Int. Cl.
*G02B 27/22* (2018.01)
*G06F 13/00* (2006.01)
(Continued)

(52) U.S. Cl.
CPC .............. *G06T 17/10* (2013.01); *G02B 27/22* (2013.01); *G06F 9/00* (2013.01); *G06T 19/00* (2013.01);
(Continued)

(58) Field of Classification Search
None
See application file for complete search history.

(56) References Cited

U.S. PATENT DOCUMENTS

2010/0187546 A1* 7/2010 Fushimi .................. H01L 33/62
                                                    257/88
2011/0082667 A1* 4/2011 Ibarz ...................... G06T 15/503
                                                    703/1

(Continued)

FOREIGN PATENT DOCUMENTS

JP    2000-254123 A    9/2000
JP    2002-517789      6/2002
(Continued)

OTHER PUBLICATIONS

International Search Report of International Application No. PCT/JP2015/063512 completed Jul. 22, 2015 and dated Aug. 4, 2015 (4 pages).

*Primary Examiner* — Mark K Zimmerman
*Assistant Examiner* — YuJang Tswei
(74) *Attorney, Agent, or Firm* — Pyprus Pte Ltd (57) ABSTRACT

Provided is a method for generating light emission data for a three-dimensional display provided with a plurality of multicolor light emitting elements arranged in three-dimensional directions, the method comprising: a modeling step for acquiring a 3D polygon model; a voxelization step for representing the 3D polygon model by a plurality of voxels and calculating position information of each of the voxels; a surface color calculation step for calculating, for the 3D polygon model, color information of a front-side surface with respect to a specific point of view and color information of a back-side surface with respect to the specific point of view; an interior color calculation step for referring to the position information and calculating, on the basis of the color information of the front-side surface and the color (Continued)

information of the back-side surface, color information of voxels located between the front-side surface and the back-side surface; and a mapping step for referring to the position information and mapping the color information of each of the voxels to a two-dimensional relative position to generate the light emission data.

2 Claims, 6 Drawing Sheets

(51) Int. Cl.
*G06F 9/00* (2006.01)
*G06T 17/00* (2006.01)
*G06T 19/00* (2011.01)
*H04N 13/324* (2018.01)
*H04N 13/388* (2018.01)
*G06T 17/10* (2006.01)

(52) U.S. Cl.
CPC ........... *H04N 13/324* (2018.05); *G06F 13/00* (2013.01); *H04N 13/388* (2018.05); *H04N 2213/001* (2013.01)

(56) References Cited

U.S. PATENT DOCUMENTS

2013/0286016 A1* 10/2013 Nakamura ............. G06T 15/06 345/426
2015/0251357 A1* 9/2015 Jin ......................... G05B 15/02 700/119

FOREIGN PATENT DOCUMENTS

| JP | 2005-173212 | 6/2005 |
| JP | 2006-267390 A | 10/2006 |
| JP | 2007-71919 A | 3/2007 |
| WO | WO2013121341 A1 | 8/2013 |

* cited by examiner

VOXELIZATION STEP

VOXELIZATION STEP

(a)

(b)

(c)

(d)

THREE-DIMENSIONAL DISPLAY AND DATA GENERATION METHOD

TECHNICAL FIELD

The present invention relates to a three-dimensional display in which multicolor light emitting elements serving as pixels are arranged three-dimensionally, and a method of generating light emission data for the three-dimensional display. Specifically, the present invention relates to technology for causing multicolor light emitting elements arranged three-dimensionally to emit light and thus enabling displaying of a three-dimensional image with volume.

BACKGROUND ART

In the related art, a three-dimensional image display device that enables a three-dimensional image with volume to be visually recognized from all directions of 360 degrees is known. For example, the three-dimensional image display device is used in an event or an exhibition and is used for a purpose of advertisement. In addition, it is also known that the three-dimensional image display device is mounted on an amusement apparatus such as a game machine.

For example, a three-dimensional image display device that rotates a transparent display having pixels arranged in a planar matrix and thus displays a three-dimensional image with volume is known in the related art (e.g., Patent Literatures 1 and 2). The three-dimensional image display device has a transparent display that includes spontaneous light emitting pixels arranged in a dot matrix, and a drive mechanism that drives rotation of the transparent display. Then, the three-dimensional image display device is controlled so as to cause the transparent display to display an image in synchronization with a rotation angle of the transparent display, and thus cause a three-dimensional image to be visually recognized by an observer. According to the device having the configuration of rotating the transparent display, it is possible to cause the three-dimensional image to be visually recognized even by an observer with naked eyes without using equipment such as special glasses.

CITATION LIST

Patent Literatures

Patent Literature 1: JP 2005-173212 A
Patent Literature 2: JP 2002-517789 A

SUMMARY OF INVENTION

Technical Problem

Meanwhile, in an event or a game of a user participation type, it may also be required to render a three-dimensional image in real time and cause the three-dimensional image display device to display the three-dimensional image, according to a demand or an operation of a user. For example, technology such that a portable information terminal (smart phone) possessed by a user and the three-dimensional image display device are connected by wireless communication and a three-dimensional image to be displayed by the three-dimensional image display device changes according to instruction information input to the portable information terminal has also been popular recently. Accordingly, a three-dimensional image moves or changes in real time according to a demand or an operation of a user, and thus a more attractive experience can be provided to the user.

However, the three-dimensional image display device according to the related art described in Patent Literatures 1 and 2 needs to cause the transparent display to display an image in synchronization with a rotation angle of the transparent display and it is difficult to adjust timing of causing the display to display an image. For this reason, it has been considered difficult for the three-dimensional image display device according to the related art to display a three-dimensional image having a complicated shape. In addition, since the three-dimensional image display device according to the related art is difficult to control to display a three-dimensional image, it has not been easy to render a three-dimensional image in real time and display the three-dimensional image, according to a demand or an operation of a user, for example.

Further, since the three-dimensional image display device according to the related art rotates the transparent display at a high speed and displays a three-dimensional image, it has been considered difficult to increase a size of the device itself. That is, when the device has an increased size, a transparent display having an increased size becomes necessary and a drive mechanism having a high output also becomes necessary in order to rotate the transparent display having an increased size at a high speed. In addition, even when the drive mechanism having a high output is used, it has been difficult to rotate the transparent display having an increased size at a high speed to the extent that a three-dimensional image is visually recognizable. Further, since the three-dimensional image display device needs to rotate the transparent display, the three-dimensional image display device has been a device that cannot be used safely in an event or the like at the outdoors where the wind blows, for example.

From the above-described point of view, a problem to be solved by the present invention is to provide a method that enables real-time rendering of a three-dimensional image with volume and visually recognizable from all directions of 360 degrees. In addition, a problem to be solved by the present invention is to provide a new three-dimensional display that can appropriately display a three-dimensional image with volume. Further, a problem to be solved by the present invention is to provide a three-dimensional display that can have an increased size and can be used even outdoors. The present invention provides a solution to at least one of the problems.

Solution to Problem

A first aspect of the present invention relates to a method of generating light emission data for a three-dimensional display. Here, the three-dimensional display includes a plurality of multicolor light emitting elements arranged three-dimensionally in a horizontal direction, a vertical direction, and a depth direction. Note that the horizontal direction, the vertical direction, and the depth direction are directions to form an orthogonal coordinate system of a three-dimensional space in which the directions are three-dimensionally orthogonal to one another.

The method according to the present invention includes a modeling step, a voxelization step, a surface color calculation step, an interior color calculation step, and a mapping step.

The modeling step is a step of acquiring a 3D polygon model. The 3D polygon model may be created by using a computer, may be acquired from an internal or external storage device of the computer, or may be a model downloaded via an information communication line (Internet).

The voxelization step is a step of representing the 3D polygon model by a plurality of voxels and calculating position information of each of the voxels. Voxelization is a technique of representing the 3D polygon model as a collection of cubes with small volume. For this reason, each voxel serves as one element representing volume.

The surface color calculation step is a step of calculating color information of a front face side surface with respect to a specific point of view and color information of a back face side surface with respect to the specific point of view, for the 3D polygon model.

The interior color calculation step is a step of referring to the position information of each of the voxels and calculating color information of voxels located between the front face side surface and the back face side surface, on the basis of the color information of the front face side surface and the color information of the back face side surface.

The mapping step is a step of referring to the position information of each of the voxels, mapping the color information of each of the voxels to a two-dimensional relative position, and generating the light emission data. That is, the color information of each voxel is replaced with the light emission data represented two-dimensionally and easy to process in the three-dimensional display, in order to cause the three-dimensional display to display the voxelized 3D model.

As described above, in the method according to the present invention, the 3D polygon model is voxelized and the color information of each voxel is calculated. Here, a three-dimensional display device has a configuration in which a large number of multicolor light emitting elements are arranged three-dimensionally. For this reason, color information of voxels forming an inner portion of a model as well as voxels forming a surface of the model needs to be calculated in order to display an image of the model (that is, in order to represent volume of the model) by using the three-dimensional display device. In a two-dimensional display according to the related art, when an image of a voxelized model is displayed, color information of voxels hidden in an inner portion has not needed to be calculated. In this regard, image processing for the three-dimensional display device according to the present invention and image processing for the two-dimensional display according to the related art are clearly different. Then, in the method according to the present invention, the color information of the voxels forming the inner portion of the model is calculated on the basis of the color information of the voxels forming the surface of the model. Specifically, the color information of the front face side surface and the back face side surface of the model is calculated and subsequently the color information of the voxels of the inner portion located between the front face side surface and the back face side surface is determined by referring to the color information of the front face side surface and the back face side surface. For example, the color information of the voxels of the inner portion may be an intermediate color of the color information of the front face side surface and the back face side surface or may be a gradation color such as a color that gradually changes from the front face side surface to the back face side surface. Accordingly, the color information of the voxels of the inner portion is calculated indirectly on the basis of the color information of the front face side surface and the back face side surface, and thus high-speed processing can be realized. Therefore, according to the method according to the present invention, it becomes possible to render in real time a three-dimensional image with volume and visually recognizable from all directions of 360 degrees.

In the method according to the present invention, in the three-dimensional display, the plurality of multicolor light emitting elements coupled in the vertical direction is preferably arranged in a plurality of lines in a circumferential direction to form layers and a plurality of layers of the multicolor light emitting elements is preferably formed in a shape of a concentric circle.

In this case, the mapping step of the method according to the present invention preferably includes referring to the position information of each of the voxels, mapping the color information of each of the voxels to a two-dimensional relative position corresponding to each of the layers of the multicolor light emitting elements, and generating light emission data for each of the layers of the multicolor light emitting elements.

As described above, in the three-dimensional display, a large number of the multicolor light emitting elements are arranged in the vertical direction and the circumferential direction so as to form the layers of an approximately cylindrical shape. In addition, the plurality of layers of the multicolor light emitting elements having the approximately cylindrical shape is formed in a shape of a concentric circle, and thus the three-dimensional display is constructed. Accordingly, in the present invention, when only one layer of the multicolor light emitting elements is considered, the multicolor light emitting elements are arranged in parallel in two-dimensional arrangement (2D) of the vertical direction and the circumferential direction. Then, the plurality of layers of the multicolor light emitting elements is arranged with depths, and thus three-dimensional arrangement (3D) is constructed. For this reason, light emission colors of the multicolor light emitting elements can be calculated for each layer. That is, the light emission data does not need to be provided to the three-dimensional display as data of the three-dimensional arrangement, and the light emission data only needs to be provided to the three-dimensional display as data of the two-dimensional arrangement. Thus, generation of the light emission data to be provided to the three-dimensional display becomes simple and further high-speed processing becomes possible. In addition, the shape of the three-dimensional display is an approximately cylindrical shape, and thus a three-dimensional image of a model becomes easy to visually recognize from all directions of 360 degrees.

In the method according to the present invention, the voxelization step preferably includes a first step, a second step, and a third step.

The first step is a step of calculating position information of voxels located at a front face with respect to a specific point of view, estimating that voxels also exist closer to the back face side than the voxels located at the front face, and performing rendering, for the 3D polygon model.

The second step is a step of calculating position information of voxels located at a back face with respect to the specific point of view, estimating that voxels also exist closer to the back face side than the voxels located at the back face, and performing rendering, for the 3D polygon model.

The third step is a step of determining exclusive OR of a rendering result of the first step and a rendering result of the second step and obtaining the position information of each of the voxels configuring the 3D polygon model.

As described above, the position information of each of the voxels configuring the 3D polygon model is calculated by exclusive OR, and thus it becomes possible to determine positions of the voxels without moving the position of the specific point of view or moving the 3D polygon model. Thus, high-speed processing of a computer in the voxelization step can be achieved. As a result, according to the present invention, it becomes possible to render a three-dimensional image of a model in real time.

A second aspect of the present invention relates to a three-dimensional display.

The three-dimensional display according to the present invention includes a plurality of multicolor light emitting elements arranged in a horizontal direction, a vertical direction, and a depth direction.

Specifically, in the three-dimensional display according to the present invention, the plurality of multicolor light emitting elements coupled in the vertical direction is arranged in a plurality of lines in a circumferential direction to form layers and a plurality of layers of the multicolor light emitting elements is formed in a shape of a concentric circle.

As in the configuration described above, the three-dimensional display has a structure in which multiple layers having an approximately cylindrical shape are superposed on one another, and thus a three-dimensional image of a model can visually be recognized from all directions of 360 degrees. In addition, as described above, since in the three-dimensional display according to the present invention, a plurality of two-dimensional layers is superposed on one another to form three-dimensional arrangement, the three-dimensional display can handle light emission data of a two-dimensional structure. For this reason, according to the three-dimensional display according to the present invention, a three-dimensional image can be processed at a high speed.

The three-dimensional display according to the present invention preferably includes a coupling member, an upper frame, and a lower frame. The coupling member is a string-like member which couples the plurality of multicolor light emitting elements vertically.

The upper frame is a member to which an upper end of the coupling member is joined and the lower frame is a member to which a lower end of the coupling member is joined.

As in the configuration described above, the plurality of multicolor light emitting elements is coupled by the one coupling member and the upper end and the lower end of the coupling member are connected to the upper frame and the lower frame, respectively, and thus a structure of the three-dimensional display can be simplified. For this reason, the three-dimensional display having an increased size can be achieved at a relatively low cost. In addition, the upper end and the lower end of the coupling member are fixed to the upper frame and the lower frame, and thus a position of each multicolor light emitting element can simply be fixed. For example, even when the three-dimensional display is installed at the outdoors where the wind blows, it becomes possible to appropriately display a three-dimensional image because the position of each multicolor light emitting element can be prevented from varying.

Advantageous Effects of Invention

According to the present invention, a three-dimensional image with volume and visually recognizable from all directions of 360 degrees can be rendered in real time.

According to the present invention, a new three-dimensional display capable of appropriately displaying a three-dimensional image with volume can be provided. The three-dimensional display according to the present invention can be relatively simple to increase in size and can be used safely even outdoors.

DESCRIPTION OF EMBODIMENTS

Hereinafter, embodiments of the present invention will be described with reference to the drawings. The present invention is not limited to the embodiments described below and includes modifications made appropriately by and obvious to those skilled in the art from the following embodiments.

[Three-Dimensional Display]

Figure 1:
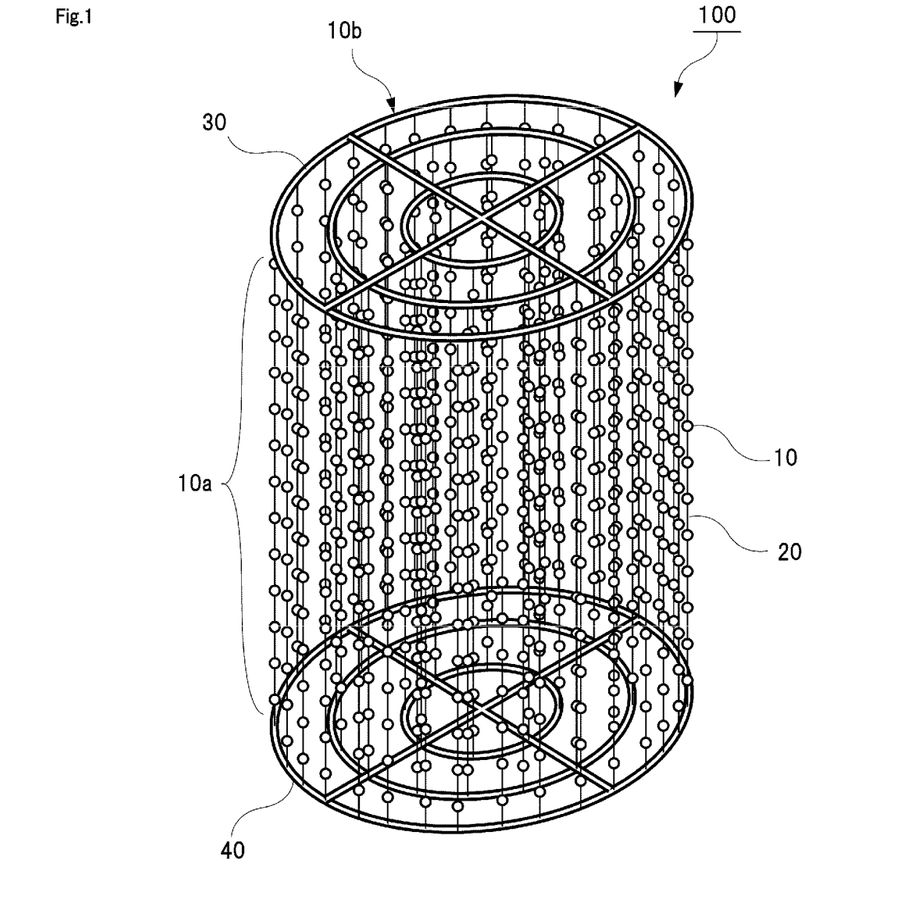
FIG. 1 is a schematic view simply illustrating a structure of a three-dimensional display according to the present invention.

FIG. 1 simply illustrates a structure of a three-dimensional display 100 according to the present invention. As illustrated in FIG. 1, the three-dimensional display 100 has a structure in which a plurality of spherical multicolor light emitting elements 10 is arranged three-dimensionally in a vertical direction, a horizontal direction, and a depth direction. Here, the "vertical direction," the "horizontal direction," and the "depth direction" are directions to form an orthogonal coordinate system of a three-dimensional space in which the directions are three-dimensionally orthogonal to one another. Accordingly, the plurality of multicolor light emitting elements 10 is arranged three-dimensionally, and thus the three-dimensional display 100 can display a three-dimensional image with volume. That is, each multicolor light emitting element 10 functions as a pixel for displaying a three-dimensional image. Note that in FIG. 1, density of the multicolor light emitting elements 10 (the number of pixels) is roughly drawn in order to facilitate understanding of the structure of the three-dimensional display 100, but increase in the density of the multicolor light emitting elements 10 (the number of pixels) can improve resolution of a three-dimensional image.

Specifically, as illustrated in FIG. 1, in the three-dimensional display 100, the plurality of multicolor light emitting elements 10 is coupled vertically by one string-like coupling member 20. The plurality of multicolor light emitting elements 10 provided in the coupling member 20 is each preferably arranged at an equivalent interval in the vertical direction. A series of multicolor light emitting element groups 10a that extend vertically are formed by the plurality of multicolor light emitting elements 10 and the one coupling member 20.

In addition, the plurality of multicolor light emitting element groups 10a is arranged in parallel along a circumferential direction. At this time, the plurality of multicolor light emitting element groups 10a is preferably arranged at an equivalent interval along the circumferential direction.

Accordingly, the plurality of multicolor light emitting element groups 10a is arranged on a circumference and thus layers of the multicolor light emitting elements 10 (hereinafter, referred to as multicolor light emitting element layers 10b) are formed.

The multicolor light emitting element layers 10b are layers formed in an approximately cylindrical shape. As illustrated in FIG. 1, the plurality of multicolor light emitting element layers 10b is formed. That is, the plurality of cylindrical multicolor light emitting element layers 10b is formed in a shape of a concentric circle. FIG. 1 illustrates an example in which the three multicolor light emitting element layers 10b are formed. Note that the number of the multicolor light emitting element layers 10b can also be three or more. The number of the multicolor light emitting element layers 10b is preferably 10 or more. Among the multicolor light emitting element layers 10b, one located at an outer side has a longer circumference, and one located at an inner side has a shorter circumference. In this way, the three-dimensional display 100 can be formed in a cylindrical shape (or a columnar shape).

In addition, the three-dimensional display 100 includes an upper frame 30 and a lower frame 40. The upper frame 30 and the lower frame 40 are arranged at positions where the upper frame 30 and the lower frame 40 face each other in the vertical direction. The plurality of multicolor light emitting elements 10 is located between the upper frame 30 and the lower frame 40. That is, the string-like coupling member 20 forming the multicolor light emitting element group 10a has an upper end joined to the upper frame 30 and a lower end joined to the lower frame 40. The upper frame 30 may be suspended from a ceiling, a crane or the like via a suspending member (not illustrated) or the like. In addition, the lower frame 40 may be in contact with a ground surface or may be located in the air. However, when the lower frame 40 is suspended in the air, the lower frame 40 is preferably fixed on the ground surface by using another fixing member (not illustrated) so as to prevent the lower frame 40 from swinging. Accordingly, the multicolor light emitting element groups 10a hanging between the upper frame 30 and the lower frame 40 are suspended, and thus it becomes possible to easily fix a position of each multicolor light emitting element 10.

Figure 2:
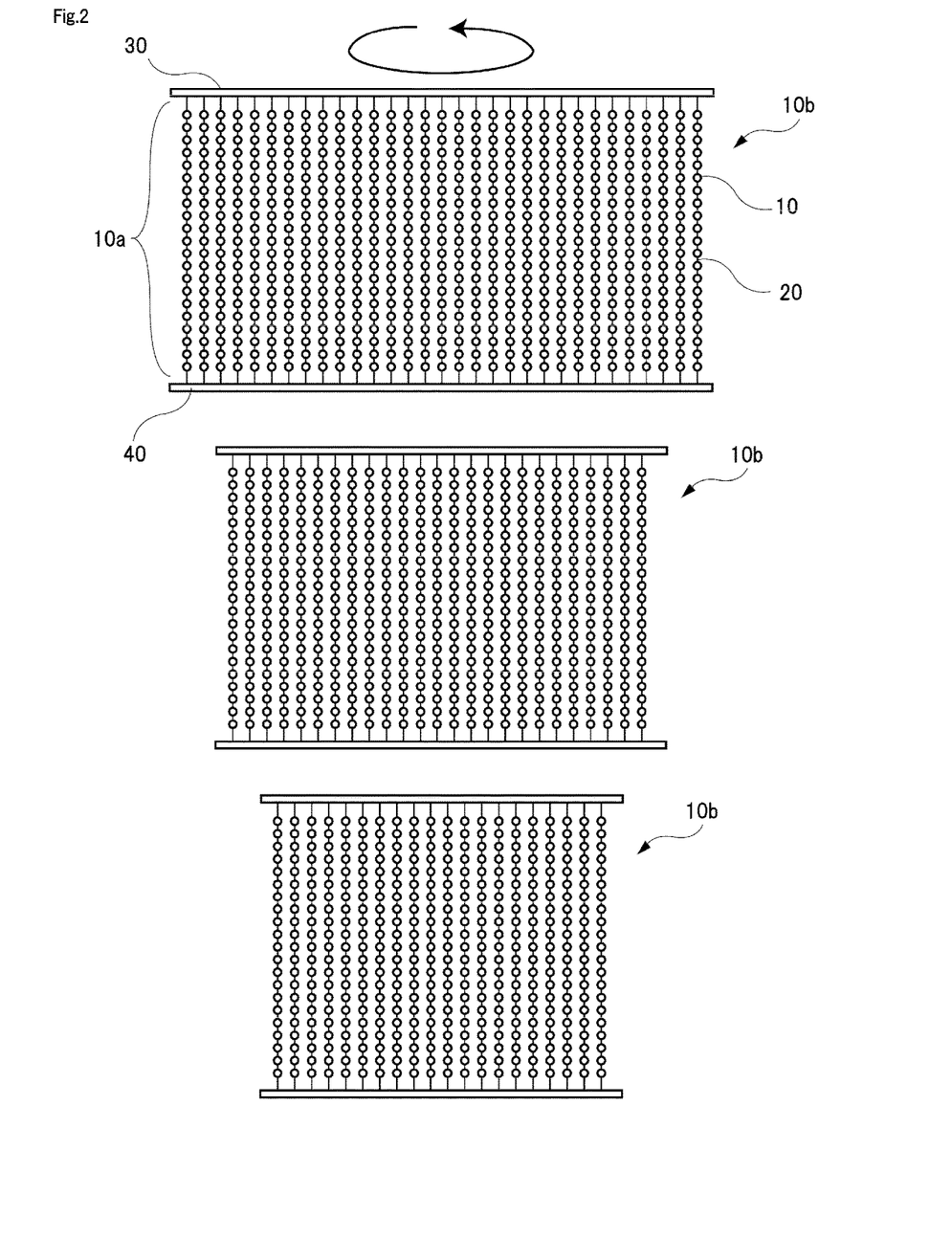
FIG. 2 is a conceptual development schematic view illustrating a structure of a three-dimensional display according to the present invention.

FIG. 2 illustrates a conceptual development view of the plurality of multicolor light emitting element layers 10b configuring the three-dimensional display 100. As illustrated in FIG. 2, in the development view of the multicolor light emitting element layers 10b that are originally cylindrical, the multicolor light emitting element layers 10b can be each considered as a two-dimensional plane. That is, in each multicolor light emitting element layer 10b, the plurality of multicolor light emitting elements 10 is arranged in a dot matrix at a regular interval in a row direction and a column direction. For this reason, light emission data of a two-dimensional structure (2D) corresponding to each of the multicolor light emitting element layers 10b is provided to the three-dimensional display 100, and thus the three-dimensional display 100 can display an image. Specifically, it becomes possible to map color information of a 3D model with volume to a relative position of 2D such that the color information corresponds to each of the plurality of multicolor light emitting element layers 10b, and to handle the mapping data of 2D as light emission data of the multicolor light emitting elements 10. Hence, since the light emission data to be provided to the three-dimensional display 100 becomes simple, the three-dimensional display 100 can process the light emission data at a high speed to display the light emission data.

The multicolor light emitting element 10 is a light emitting body that can emit light with at least two or more colors. A known light source such as a light emitting diode (LED) can be used as the multicolor light emitting element 10. For example, a three-color LED having three LEDs emitting light with red, green, and blue colors as one package may be used as the multicolor light emitting element 10 or a two-color LED may be used as the multicolor light emitting element 10. Each of the multicolor light emitting elements 10 is electrically connected to a control device (not illustrated). Thus, the multicolor light emitting element 10 can change a light emission color, on the basis of a control signal from the control device. The multicolor light emitting elements 10 are each independently controlled in the light emission color by the control device. Accordingly, the light emission color of each of the plurality of multicolor light emitting elements 10 is individually controlled, and thus it becomes possible to represent a complicated three-dimensional image.

The three-dimensional display 100 having the above-described configuration controls presence or absence of light emission of the multicolor light emitting element 10 and the light emission color of the multicolor light emitting element 10, and thus can display a three-dimensional image with volume. That is, the three-dimensional display 100 causes not only the multicolor light emitting elements 10 corresponding to a surface of a three-dimensional image but also the multicolor light emitting elements 10 corresponding to an inner portion of the three-dimensional image to emit light, and thus can display the three-dimensional image with volume. In addition, since the three-dimensional display 100 has a cylindrical shape (or a columnar shape), an observer can visually recognize the three-dimensional image from all directions of 360 degrees. Moreover, various portions of the three-dimensional image can be viewed according to a viewing angle or a standing position of the observer. For this reason, the three-dimensional display 100 can provide a three-dimensional image with a sense of reality as if a model existed in the place.

[Method of Generating Light Emission Data]

In the following, a method of generating light emission data of the multicolor light emitting elements 10 to be provided to the above-described three-dimensional display 100 will be described. The light emission data is data for specifying which multicolor light emitting element 10 of the plurality of multicolor light emitting elements 10 configuring the three-dimensional display 100 emits light with what color. That is, it may be said that the light emission data is data for controlling a light emission aspect of the three-dimensional display 100. The method of generating the light emission data is executed by a computer for image processing.

Figure 3:
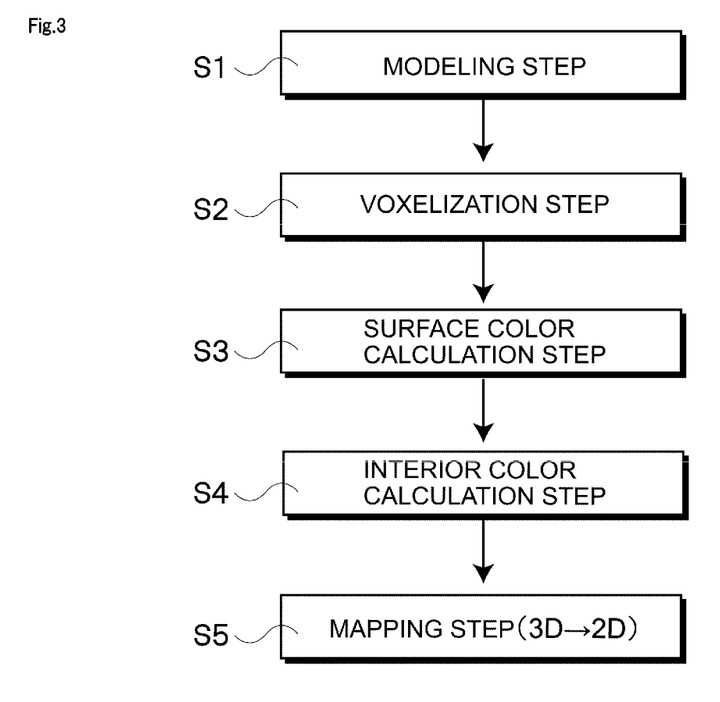
FIG. 3 is a flowchart illustrating a rendering step of a three-dimensional image according to the present invention.
Figure 4:
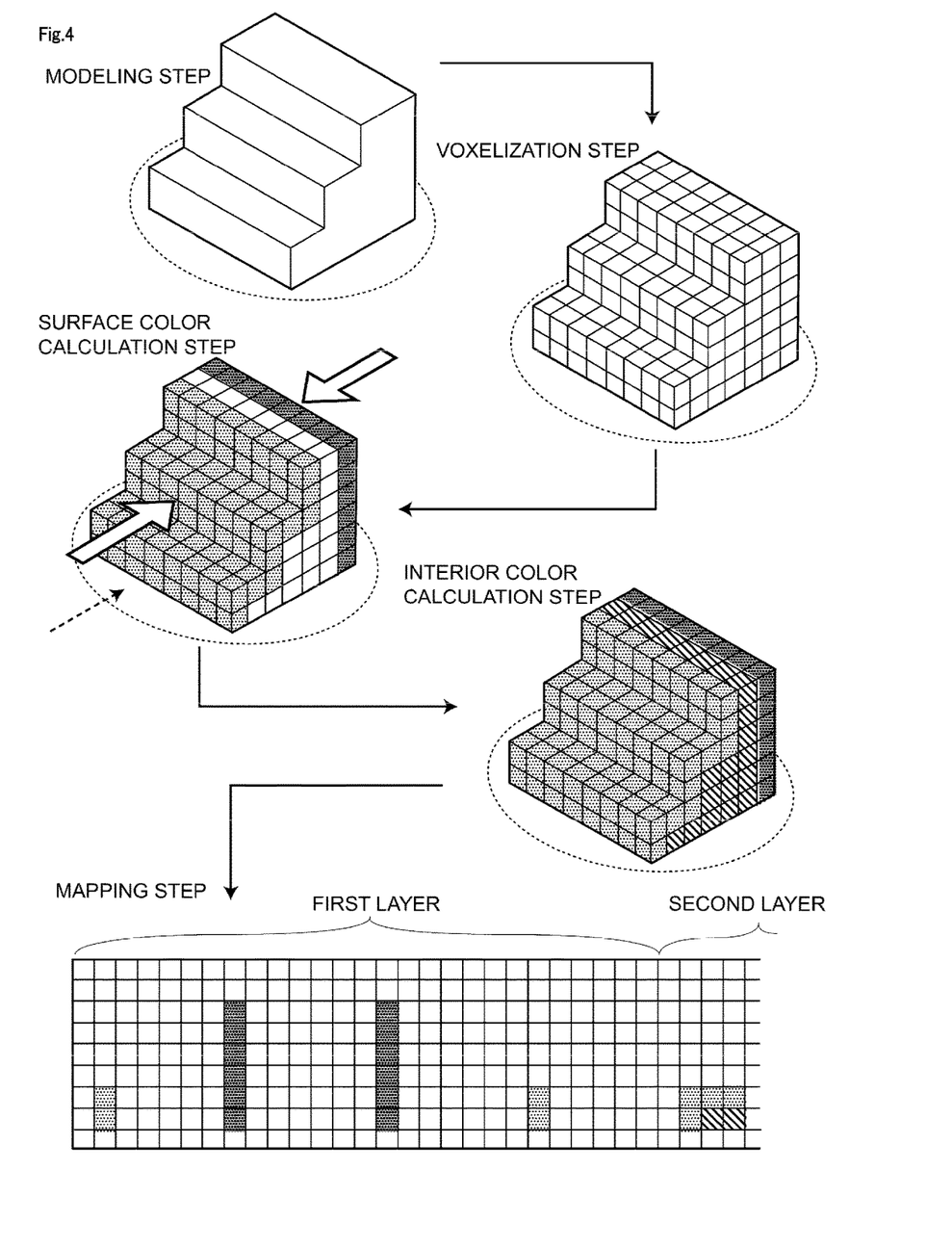
FIG. 4 is a schematic view conceptually illustrating a rendering step of a three-dimensional image according to the present invention.
Figure 5:
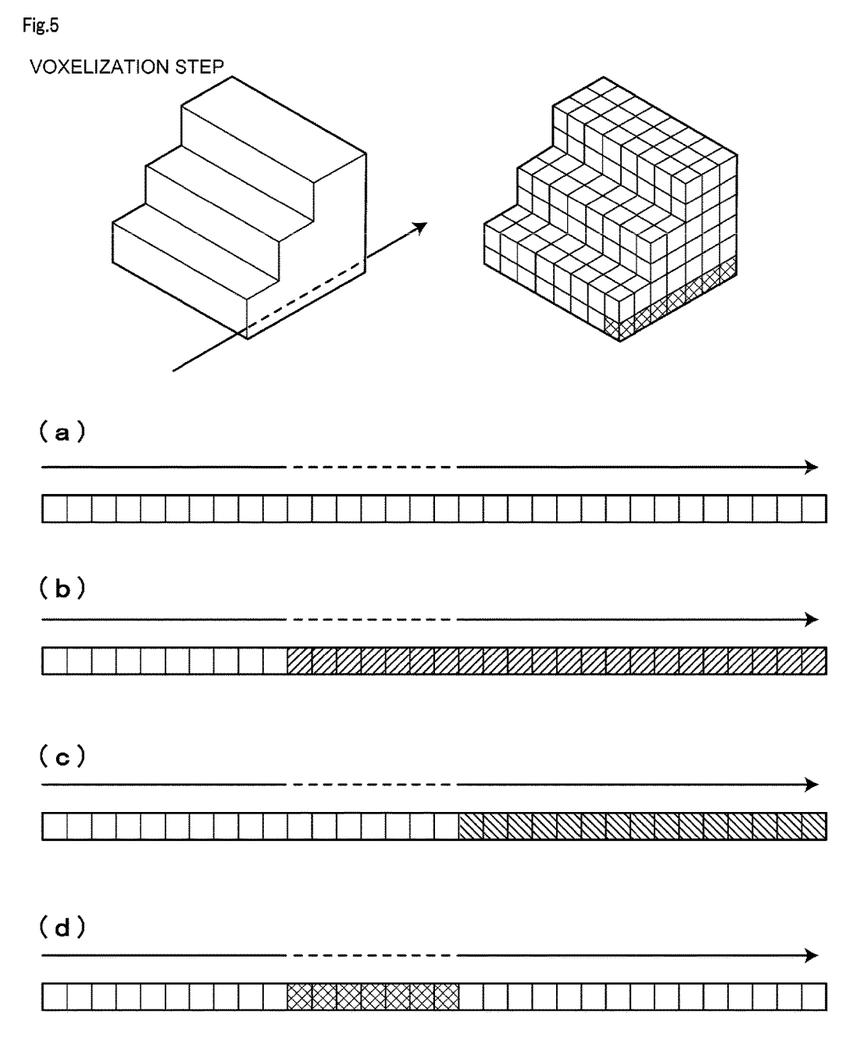
FIGS. 5(a) to 5(d) are schematic views conceptually illustrating an example of a voxelization step.
Figure 6:
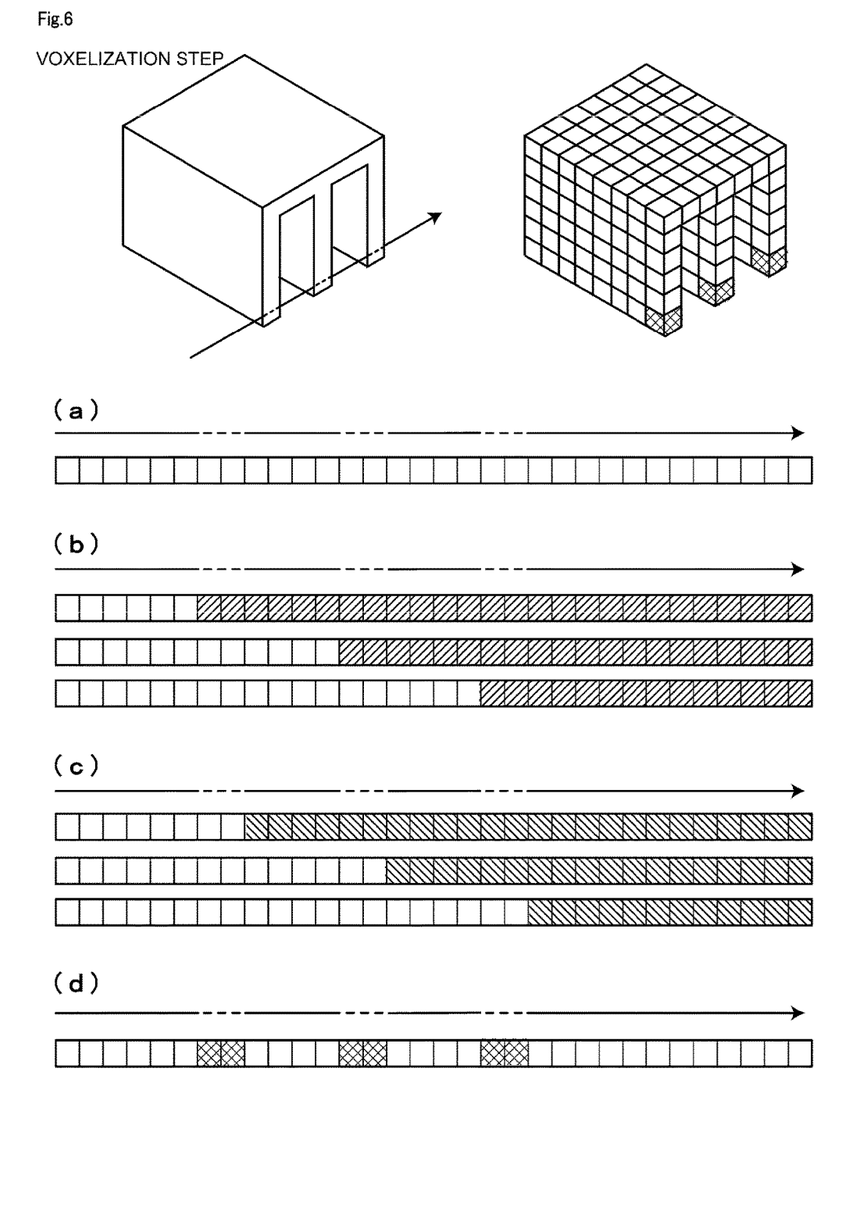
FIGS. 6(a) to 6(d) are schematic views conceptually illustrating another example of a voxelization step.

FIG. 3 is a flowchart illustrating the method of generating the light emission data. In addition, FIG. 4 schematically illustrates the method of generating the light emission data. As illustrated in FIGS. 3 and 4, the method of generating the light emission data includes a modeling step (step S1), a voxelization step (step S2), a surface color calculation step (step S3), an interior color calculation step (step S4), and a mapping step (step S5). Hereinafter, each of the steps will be described.

The modeling step (step S1) is a step of acquiring a 3D polygon model. The 3D polygon model may be created by using known computer software or may be obtained by reading a model stored in an external storage medium or a storage device in a computer. In addition, the 3D polygon model may be a model downloaded via the Internet. The 3D polygon model is a model representing a figure having a three-dimensional shape by a combination of a plurality of polygons (triangles). Note that a coordinate system by which the 3D polygon model is represented is also referred to as a modeling coordinate system (P, Q, R). In addition, in FIG. 4, a circular dotted line is drawn on the assumption of an image display range of the three-dimensional display 100. The three-dimensional display 100 can display the 3D polygon model as an image polygonally. For this reason, the modeling coordinate system (P, Q, R) by which the 3D polygon model is represented and a display coordinate system (X, Y, Z) by which the three-dimensional display 100 displays a three-dimensional image are preferably matched with each other basically. In other respects, a method known in the art of computer graphics can appropriately be adopted in the step of acquiring the 3D polygon model.

The voxelization step (step S2) is a step of representing the 3D polygon model obtained in the modeling step by a plurality of voxels and calculating position information of each voxel. As illustrated in FIG. 3, the 3D polygon model is represented by a collection of a plurality of cubes (voxels). As described above, in the present invention, the 3D polygon model is displayed as a three-dimensional image by using the three-dimensional display 100 including the plurality of multicolor light emitting elements 10 arranged three-dimensionally. For this reason, resolution of voxelization of the 3D polygon model preferably corresponds to the number of pixels (the number of the multicolor light emitting elements 10) of the three-dimensional display 100. Particularly, when the voxelization is performed such that one voxel representing the 3D polygon model corresponds to one multicolor light emitting element 10 configuring the three-dimensional display 100, image processing calculation becomes easy. However, the number of voxels and the number of pixels do not necessarily need to be matched with each other. For example, processing can also be performed such that 2×2×2 voxels correspond to one multicolor light emitting element 10.

The position information of the voxel may be calculated on the basis of a relative position of each voxel or may be calculated by giving a coordinate value to each voxel. In addition, voxelization processing is performed in a voxel space including the 3D polygon model. The voxel space is preferably a columnar space according to a columnar shape that enables the three-dimensional display 100 to display a three-dimensional image. An example of the voxel space is a binary voxel space. The binary voxel space is represented by a value (for example, 1 or 0) indicating whether there is the 3D polygon model. A voxel corresponding to the 3D polygon model is represented by "1" and is substantialized and a voxel not corresponding to the 3D polygon model is represented by "0" and is not substantialized. Note that a preferred mode of the voxelization step will be described in detail below with reference to FIGS. 5(*a*) to 5(*d*) and FIGS. 6(*a*) to 6(*d*). In other respects, a method known in the art of computer graphics can appropriately be adopted in the voxelization processing of the 3D polygon model.

The surface color calculation step (step S3) is a step of calculating color information of a front face side surface portion with respect to a specific point of view and color information of a back face side surface portion with respect to the specific point of view, for the voxelized 3D model. In FIG. 4, the specific point of view (pass) is illustrated by an arrow of a dotted line. Color information of the voxels located at a front face side and the voxels located at a back face side with respect to the point of view is determined. A technique of calculating the color information is known. For example, the color information of each voxel may be determined on the basis of a color value given to an apex of a polygon. The color information of each voxel is preferably specified by a color value of one color basically.

The interior color calculation step (step S4) is a step of determining color information of the voxels configuring an inner portion of the 3D model, on the basis of the color information of the front face side surface portion and the back face side surface portion of the 3D model calculated in the above-described surface color calculation step. That is, in the interior color calculation step, the color information of the voxels located between the voxels existing in a front face side surface and the voxels existing in a back face side surface is determined. A positional relationship of the respective voxels can be understood by referring to the position information of the respective voxels. For this reason, the front face voxels forming the front face side surface with respect to a direction of the specific point of view (the arrow of the dotted line), the back face voxels forming the back face side surface with respect to the direction of the specific point of view, and the interior voxels located between the front face voxels and the back face voxels can be determined by referring to the position information of the respective voxels. Then, the color information of the interior voxels is calculated on the basis of the color information of the front face voxels and the color information of the back face voxels. For example, the color information of the interior voxels may be calculated as an average value (intermediate value) of the color information of the front face voxels and the back face voxels. In addition, the color information of the interior voxels may be a gradation color that gradually changes from the color information of the front face voxels to the color information of the back face voxels. Accordingly, in the present invention, the color information of the interior voxels can be calculated collectively by referring to the color information of the front face voxels and the back face voxels. When the color information of the interior voxels is individually calculated, an information processing amount becomes enormous and it is difficult to realize real-time rendering. By contrast, since the color information of the interior voxels is calculated collectively by referring to the color information of the front face voxels and the back face voxels and thus high-speed processing can be achieved, it becomes possible to realize the real-time rendering.

The mapping step (step S5) is a step of mapping the color information of each voxel to two-dimensional light emission data that the three-dimensional display 100 can handle, while referring to the position information of each voxel. FIG. 4 schematically illustrates a data structure of the light emission data. As illustrated in FIG. 4, the light emission data can be represented in a dot matrix divided in a row direction and a column direction. The dot matrix of the light emission data corresponds to each of the dot matrixes (refer to FIG. 2) of the respective layers 10*b* of the multicolor light emitting elements 10 configuring the three-dimensional display 100. Particularly, a coordinate value of the dot matrix of the light emission data and a coordinate value of the dot matrix of each layer 10*b* of the multicolor light emitting elements 10 preferably correspond to each other. That is, as described above, the multicolor light emitting element layer 10*b* of the three-dimensional display 100 is configured in the two-dimensional matrix. For this reason, the light emission data for causing the multicolor light emitting element layer 10b to emit light is also configured in a matrix corresponding to the matrix of the multicolor light emitting element layer 10b. Thus, the color information of each voxel is mapped to the light emission data on the matrix, and thus each multicolor light emitting element 10 of the three-dimensional display 100 is caused to emit light and a three-dimensional image can be represented.

Accordingly, in the mapping step, the color information of each voxel constructing the 3D model is mapped to the relative position of 2D. At this time, the coordinates of each voxel may be converted into the two-dimensional coordinates (mapping coordinate system) indicating the light emission data, while the position information of each voxel in the modeling coordinate system (three dimensions) is referred to. The mapping processing can also be performed while the coordinate information of each voxel is referred and efficient processing can also be achieved by using an index.

The light emission data is generated by the computer for image processing through each step of steps S1 to S5. The light emission data is exported from the computer for image processing to the control device (LED controller) of the three-dimensional display 100. Then, the three-dimensional display 100 controls presence or absence of light emission and a light emission color of each of the plurality of multicolor light emitting elements 10, on the basis of the obtained light emission data. Thus, a three-dimensional image with volume and visually recognizable from all directions of 360 degrees can be displayed by the three-dimensional display 100.

In the following, the voxelization step will be described further in detail with reference to FIGS. 5(a) to 5(d) and FIGS. 6(a) to 6(d).

FIGS. 5(a) to 5(d) illustrate an example of the case in which a standard 3D polygon model of a solid structure is voxelized. The example of FIGS. 5(a) to 5(d) illustrates an example of the case in which rendering into a texture of 32 bits is performed.

First, as illustrated in FIG. 5(a), the texture of 32 bits is all cleared. That is, all bits of the texture are set to "0."

Next, as illustrated in FIG. 5(b), a polygon facing a front face with respect to a specific point of view is specified. In order to specify the polygon facing the front face with respect to the specific point of view, a normal vector of each polygon may be referred to. That is, in a standard state, the normal vector of the polygon faces an outer side of the model. For this reason, the specific point of view and the normal vector of each polygon may be referred to and a polygon in which an angle formed by the specific point of view and the normal vector becomes an acute angle may be determined to be the polygon facing the front face. Then, position information (depth) of the front face side polygon is mapped and all bits located closer to the back face side than the front face side polygon are set to "1." In this way, in a first step of the voxelization, for the 3D polygon model, position information of the voxels located at the front face with respect to the specific point of view is calculated, it is estimated that the voxels also exist closer to the back face side than the voxels located at the front face, and rendering is performed.

Next, as illustrated in FIG. 5(c), a polygon facing a back face with respect to the specific point of view is specified. In order to specify the polygon facing the back face with respect to the specific point of view, a normal vector of each polygon may be inverted. That is, the inverted normal vector of the polygon faces an inner side of the model. For this reason, the specific point of view and the normal vector (inverted) of each polygon may be referred to and a polygon in which an angle formed by the specific point of view and the normal vector (inverted) becomes an acute angle may be determined to be the polygon facing the back face. Then, position information (depth) of the back face side polygon is mapped and all bits located closer to the back face side than the back face side polygon are set to "1." In this way, in a second step of the voxelization, for the 3D polygon model, position information of the voxels located at the back face with respect to the specific point of view is calculated, it is estimated that the voxels also exist closer to the back face side than the voxels located at the back face, and rendering is performed.

Finally, as illustrated in FIG. 6(d), exclusive OR (XOF) of the rendering results illustrated in FIGS. 5(b) and 5(c) is calculated. The exclusive OR is a logical operation that holds true when only any one of two propositions given holds true. Specifically, a bit set to "1" on the basis of any one of the rendering results of the first step (FIG. 5(b)) and the second step (FIG. 5(c)) and set to "0" on the basis of the other of the rendering results of the first step and the second step is set to 1. In contrast, a bit set to "0" or "1" on both the rendering results of the first step and the second step is set to "0." Thus, exclusive OR of the rendering result of the first step and the rendering result of the second step is determined by exclusive OR, and thus the position information of each voxel configuring the 3D polygon model can be obtained.

FIGS. 6(a) to 6(d) illustrate an example of the case in which a 3D polygon model of a hollow structure is voxelized. The example of FIGS. 6(a) to 6(d) illustrates an example of the case in which rendering into a texture of 32 bits is performed in a similar manner to the example of FIGS. 5(a) to 5(d).

First, as illustrated in FIG. 6(a), the texture of 32 bits is all cleared. That is, here all bits of the texture are set to "0."

Next, as illustrated in FIG. 5(b), a polygon facing a front face with respect to a specific point of view is specified. In order to specify the polygon facing the front face with respect to the specific point of view, a normal vector of each polygon may be referred to. In the example illustrated in FIGS. 6(a) to 6(d), there is a plurality of polygons facing the front face. In this case, position information (depth) is mapped for each of the plurality of front face side polygons. Then, for each of the plurality of front face side polygons, all bits located closer to the back face side than each front face side polygon are set to "1." In this way, in a first step of the voxelization, for the 3D polygon model, position information of the voxels located at the front face with respect to the specific point of view is calculated, it is estimated that the voxels also exist closer to the back face side than the voxels located at the front face, and rendering is performed.

Next, as illustrated in FIG. 6(c), a polygon facing a back face with respect to the specific point of view is specified. In order to specify the polygon facing the back face with respect to the specific point of view, a normal vector of each polygon may be inverted. In the example illustrated in FIGS. 6(a) to 6(d), there is a plurality of polygons facing the back face. In this case, position information (depth) is mapped for each of the plurality of back face side polygons. Then, for each of the plurality of back face side polygons, all bits located closer to the back face side than each back face side polygon are set to "1." In this way, in a second step of the voxelization, for the 3D polygon model, position information of the voxels located at the back face with respect to the specific point of view is calculated, it is estimated that the voxels also exist closer to the back face side than the voxels located at the back face, and rendering is performed.

Finally, as illustrated in FIG. 6(d), exclusive OR (XOF) of the rendering results illustrated in FIGS. 6(b) and 6(c) is determined for each of the bits. Specifically, for each of the bits, a bit set to "1" on the basis of any one of the rendering results of the first step (FIG. 6(b)) and the second step (FIG. 6(c)) and set to "0" on the basis of the other of the rendering results of the first step and the second step is set to 1. In contrast, a bits set to "0" or "1" on both the rendering results of the first step and the second step is set to "0." Thus, exclusive OR of the rendering result of the first step and the rendering result of the second step is determined by exclusive OR, and thus the position information of each voxel configuring the 3D polygon model can be obtained.

As described above, in the voxelization step, even when the 3D polygon model has the solid structure or the hollow structure, the voxelization can be performed without problems. Then, in the above-described voxelization step, it is not necessary to move the point of view or rotate the 3D model at the time of the voxelization. Thus, high-speed processing of the computer in the voxelization step can be achieved. As a result, according to the present invention, it becomes possible to render a three-dimensional image of the model in real time.

The embodiments of the present invention are described above herein with reference to the drawings in order to represent the contents of the present invention. However, the present invention is not limited to the above-described embodiments and includes changes and improvements obvious to those skilled in the art on the basis of the contents described herein.

INDUSTRIAL APPLICABILITY

The present invention relates to a three-dimensional display capable of displaying a three-dimensional image and a light emission data generation method thereof. Therefore, the present invention can be used suitably in a computer-related industry or an amusement industry.

REFERENCE SIGNS LIST

10 Multicolor light emitting element
10a Multicolor light emitting element group
10b Multicolor light emitting element layer
20 Coupling member
30 Upper frame
40 Lower frame
100 Three-dimensional display

The invention claimed is:

1. A method of generating light emission data for a three-dimensional display including a plurality of multicolor light emitting elements arranged in a horizontal direction, a vertical direction, and a depth direction, the method comprising:

a modeling step of acquiring a 3D polygon model;
a voxelization step of representing the 3D polygon model by a plurality of voxels and calculating position information of each of the voxels;
a surface color calculation step of calculating color information of a front face side surface with respect to a specific point of view and color information of a back face side surface with respect to the specific point of view, for the 3D polygon model;
an interior color calculation step of referring to the position information and calculating color information of voxels located between the front face side surface and the back face side surface, on the basis of the color information of the front face side surface and the color information of the back face side surface; and
a mapping step of referring to the position information, mapping the color information of each of the voxels to a two-dimensional relative position, and generating the light emission data;
wherein the voxelization step includes
a first step of calculating position information of voxels located at a front face with respect to a specific point of view, estimating that voxels also exist closer to the back face side than the voxels located at front face, and performing rendering, for the 3D polygon model,
a second step of calculating position information of voxels located at a back face with respect to the specific point of view, estimating that voxels also exist closer to the back face side than the voxels located at the back face, and performing rendering, for the 3D polygon model, and
a third step of determining exclusive OR of a rendering result of the first step and a rendering result of the second step and obtaining the position information of each of the voxels configuring the 3D polygon model.

2. The method according to claim 1, wherein
in the three-dimensional display,
the plurality of multicolor light emitting elements coupled in the vertical direction is arranged in a plurality of lines in a circumferential direction to form layers and a plurality of layers of the multicolor light emitting elements is formed in a shape of a concentric circle, and
in the method,
the mapping step includes referring to the position information of each of the voxels, mapping the color information of each of the voxels to a two-dimensional relative position corresponding to each of the layers of the multicolor light emitting elements, and generating light emission data for each of the layers of the multicolor light emitting elements.

* * * * *